Figure 1:
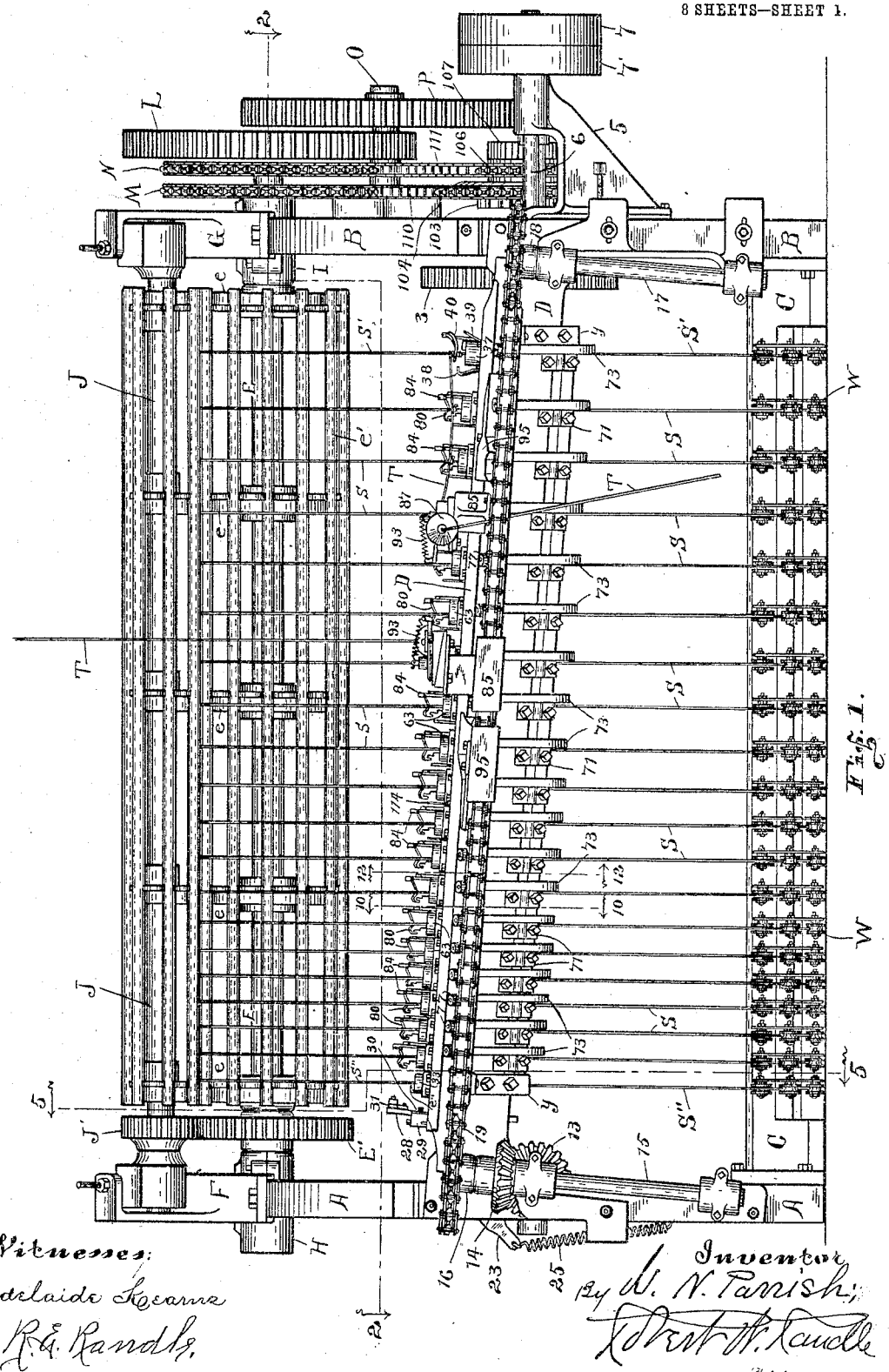

W. N. PARRISH.
MACHINE FOR MAKING WIRE FABRIC.
APPLICATION FILED MAY 21, 1909.

958,888.

Patented May 24, 1910.

8 SHEETS—SHEET 1.

Witnesses:
Adelaide Kearns
R. E. Randle

Inventor
W. N. Parrish
by Robert W. Randle
Attorney

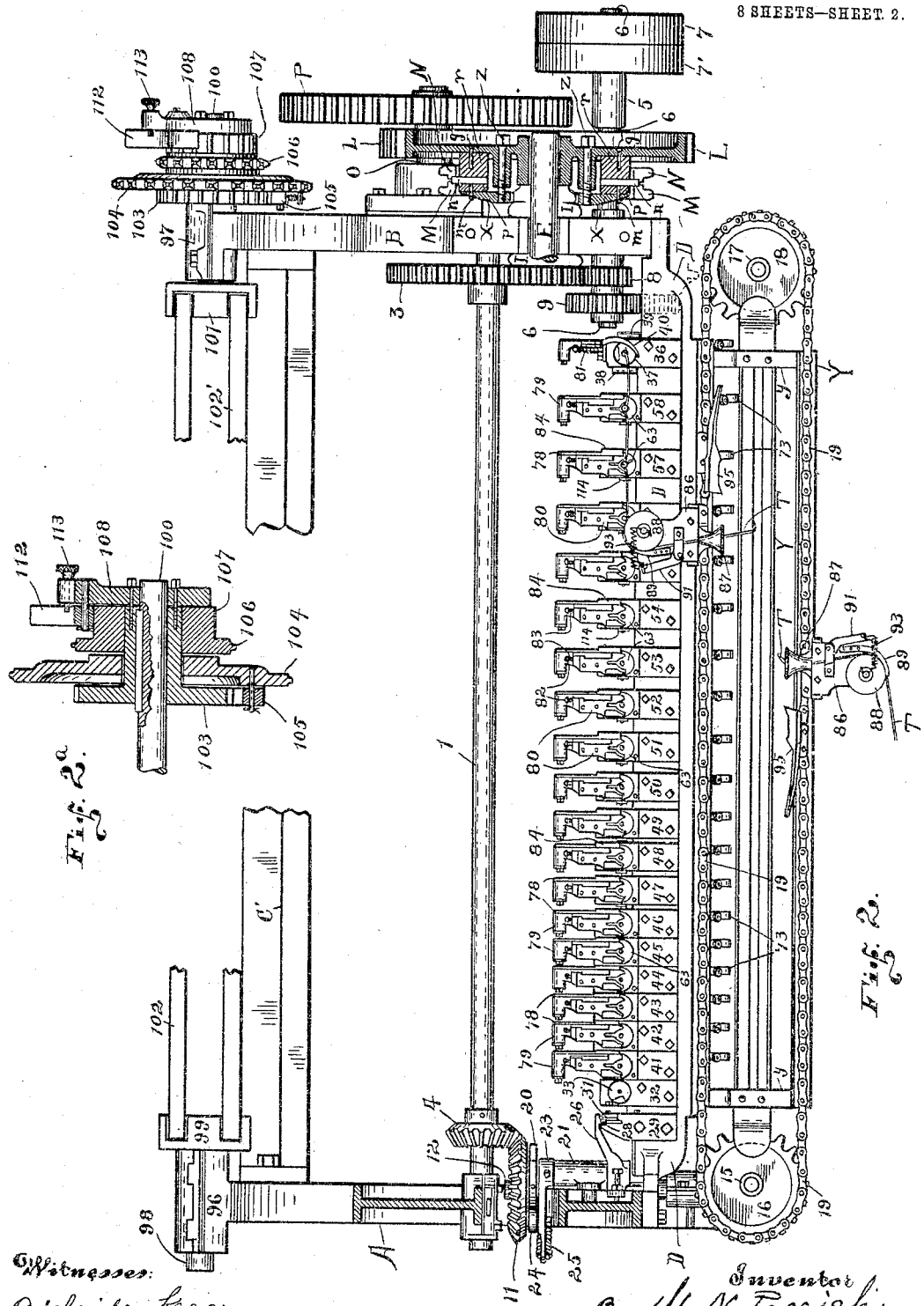

W. N. PARRISH.
MACHINE FOR MAKING WIRE FABRIC.
APPLICATION FILED MAY 21, 1909.
958,888.
Patented May 24, 1910.
8 SHEETS—SHEET 3.
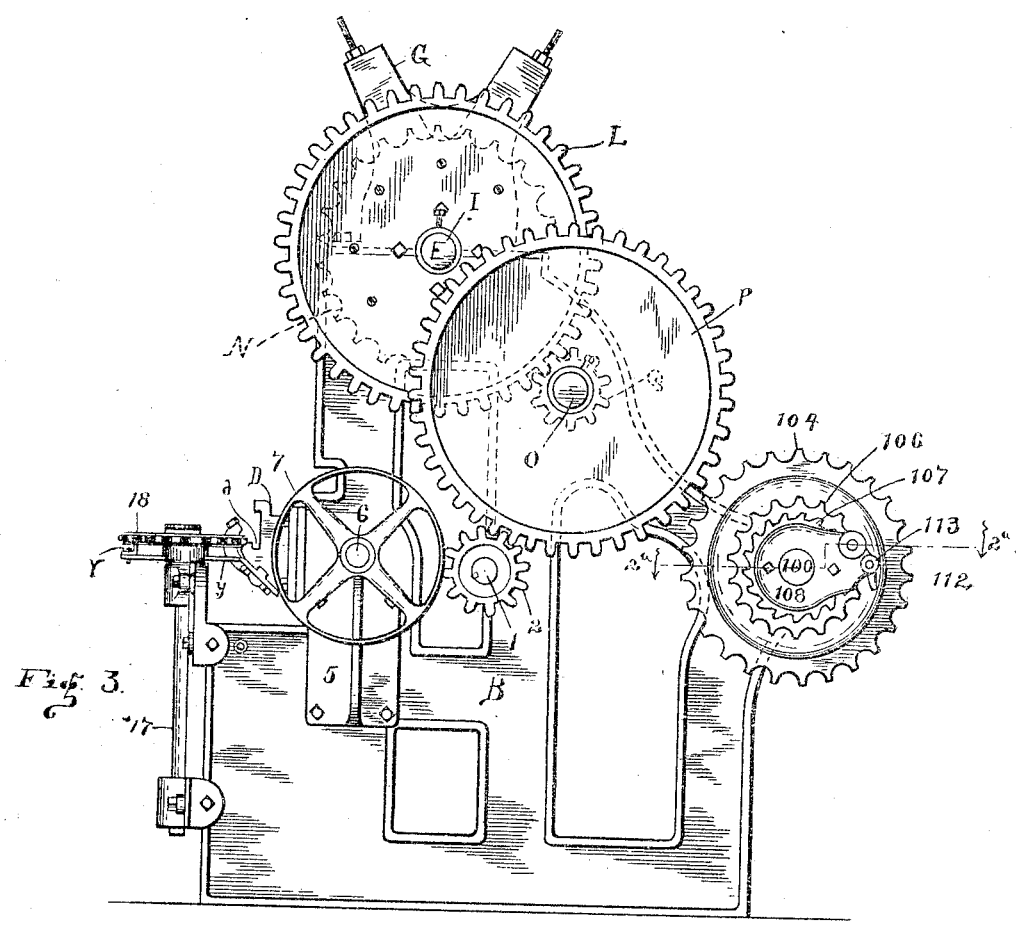
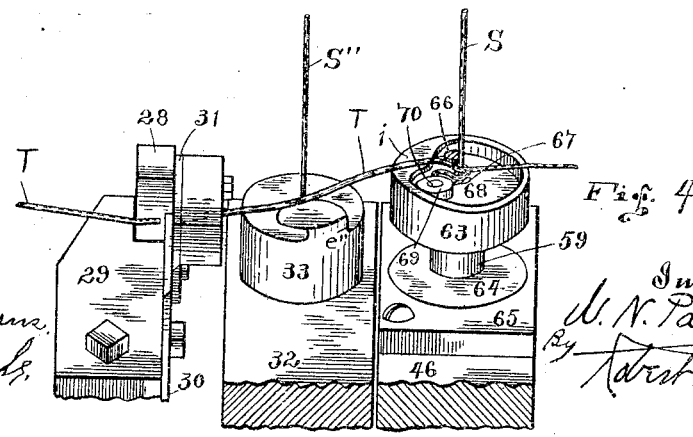

W. N. PARRISH.
MACHINE FOR MAKING WIRE FABRIC.
APPLICATION FILED MAY 21, 1909.
958,888.
Patented May 24, 1910.
8 SHEETS—SHEET 4.
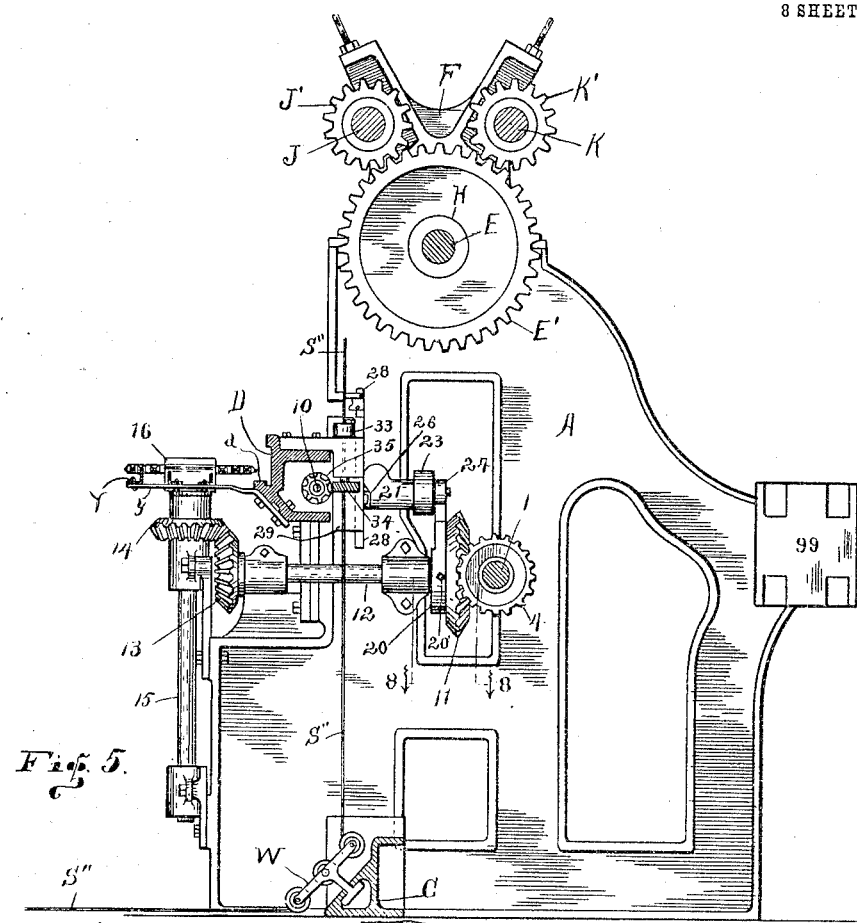
Witnesses:
Adelaide Kearns
R. E. Randle
Inventor
W. N. Parrish
By Robert W. Randle
Attorney

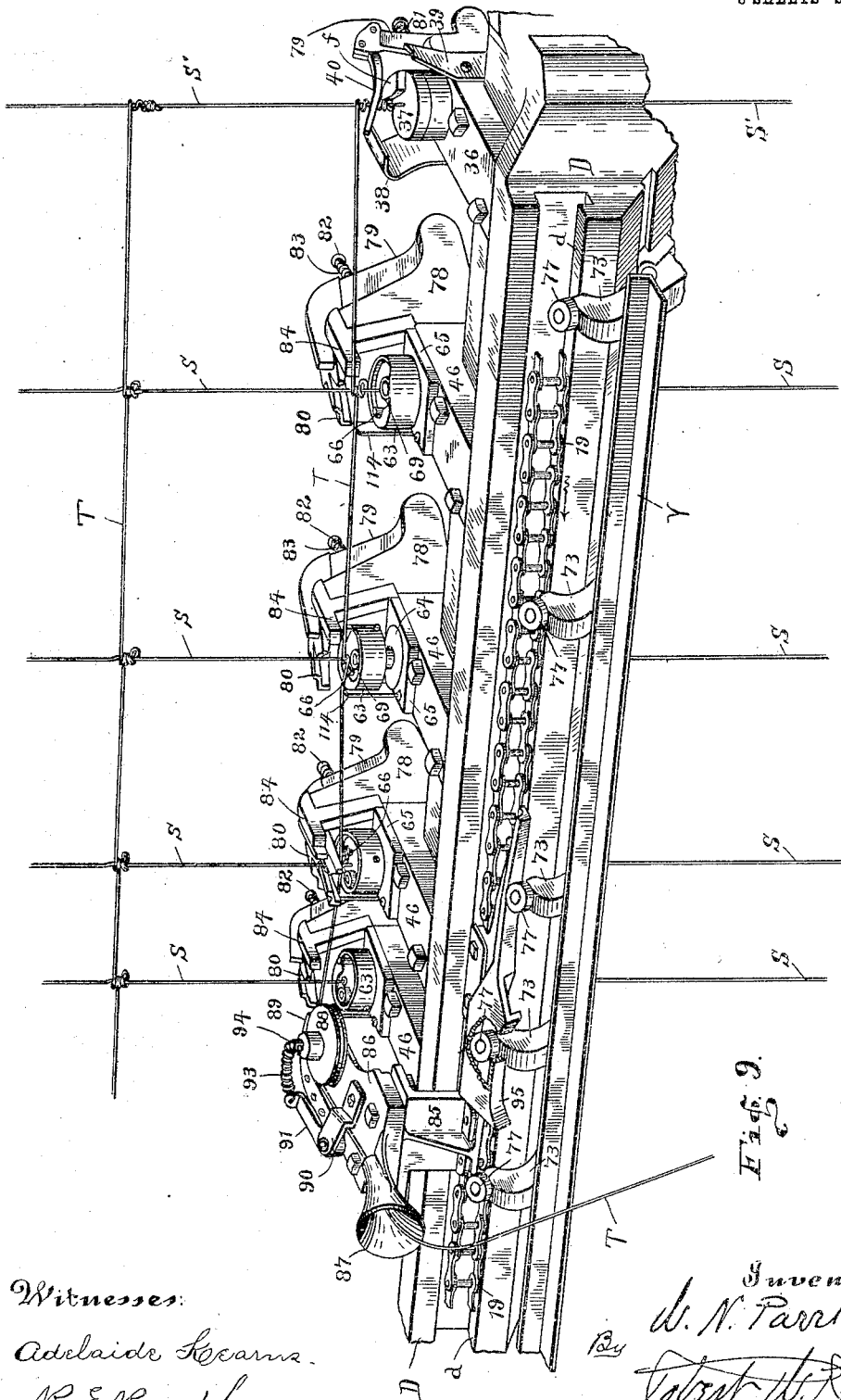

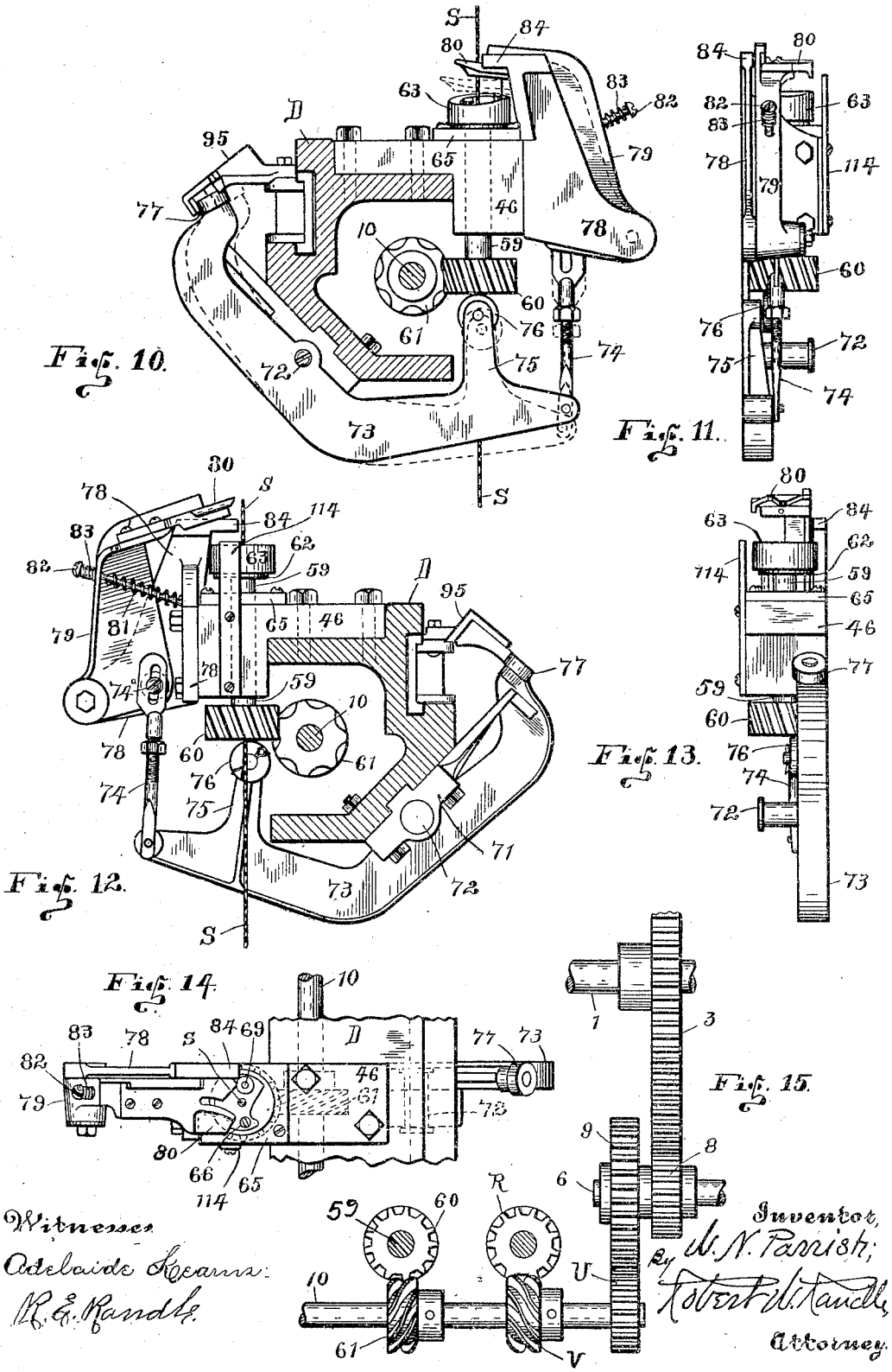

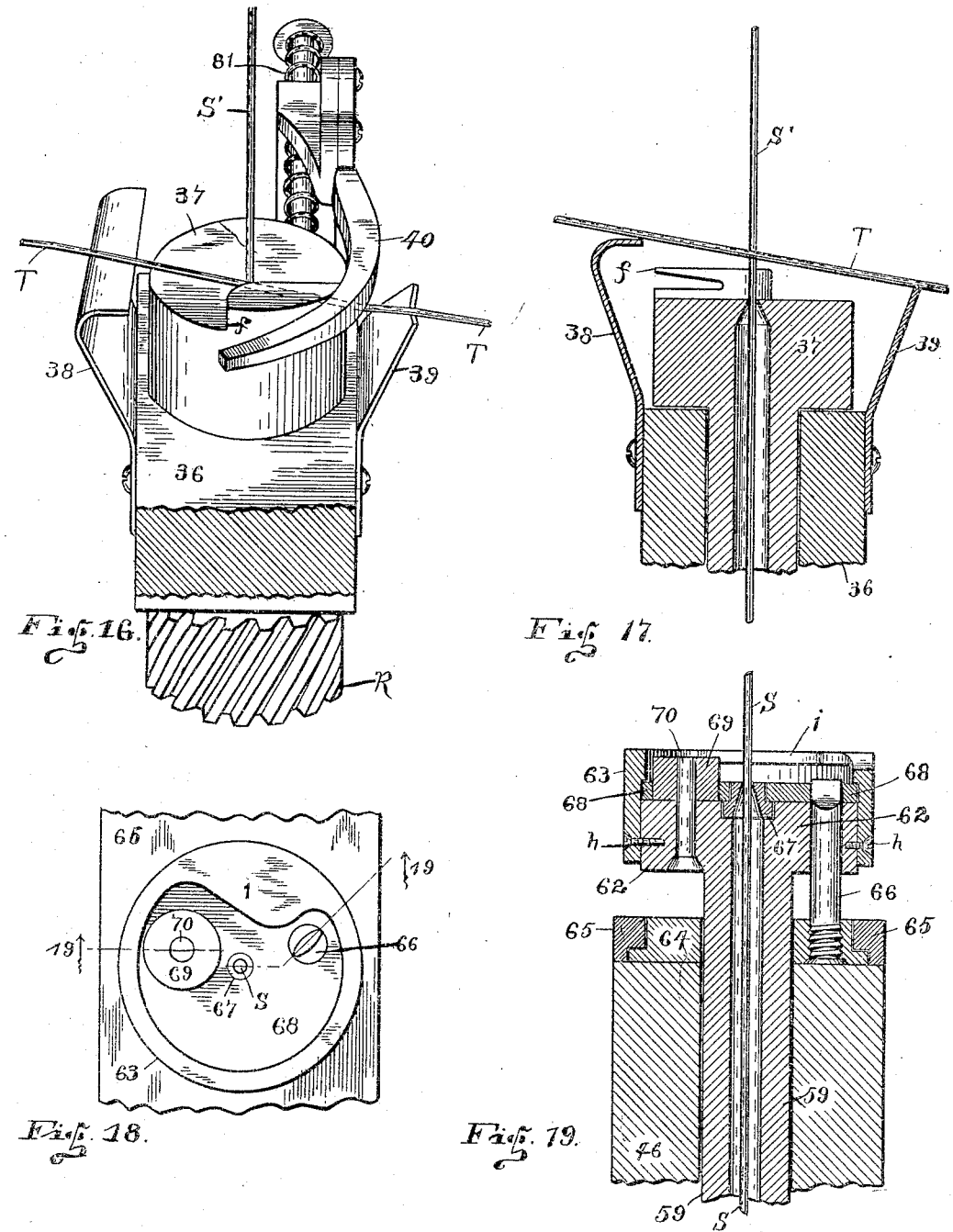

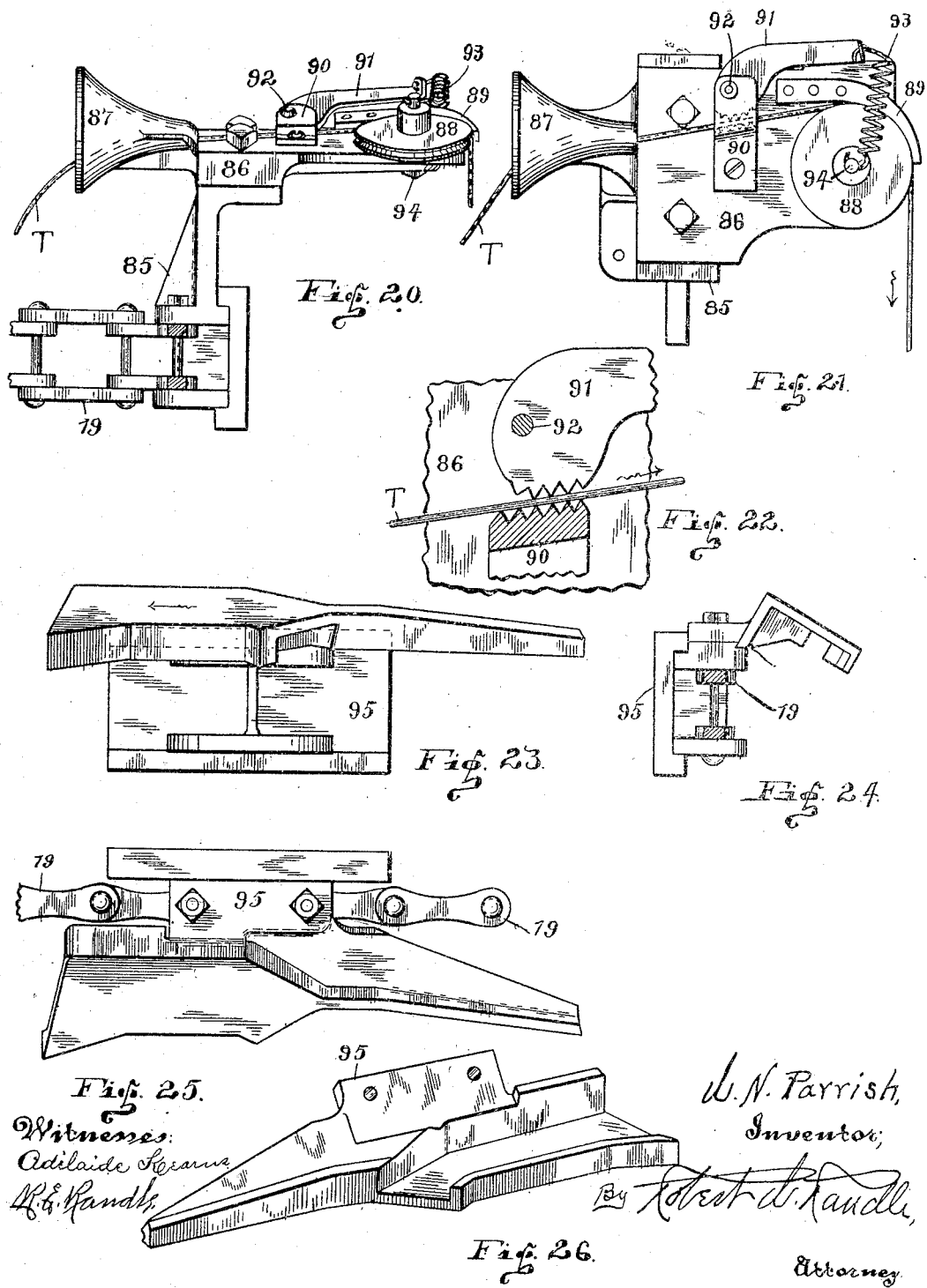

UNITED STATES PATENT OFFICE.

WILLIAM N. PARRISH, OF RICHMOND, INDIANA, ASSIGNOR TO PARRISH-ALFORD FENCE AND MACHINE COMPANY, OF KNIGHTSTOWN, INDIANA, A CORPORATION OF INDIANA.

MACHINE FOR MAKING WIRE FABRIC.

958,888.     Specification of Letters Patent.     Patented May 24, 1910.

Application filed May 21, 1909. Serial No. 497,557.

*To all whom it may concern:*

Be it known that I, WILLIAM N. PARRISH, a citizen of the United States, residing in the city of Richmond, in the county of Wayne and State of Indiana, have invented a new and useful Machine for Making Wire Fabric, of which the following is a full, clear, and accurate specification, reference being had to the accompanying drawings, forming a part thereof.

This invention relates to means adapted and to be employed in making wire fabric, the several devices constituting the machine being mutually inter-related, and the movable parts being timed with exact precision whereby the several operations automatically follow each other with absolute certainty.

The object of my present invention, broadly speaking, is to provide a machine for automatically making wire fabric, the same being constructed along new and improved lines, whereby I produce a machine which will be strong and durable in construction, positive in action, easily operated and controlled, in which a minimum of power is required for its operation, comprising a minimum number of parts, and at the same time affording a maximum of mechanical efficiency both as to operation and product.

A further object is to provide an organized machine for the automatic production of wire fabric in continuous lengths comprising a plurality of parallel strand wires spaced the desired distance apart and having transverse parallel stay wires spanning the spaces between the strand wires and self-secured thereto by means of my machine, the stay wires being continuous between each marginal strand wire, and the securing means being formed by portions of the stay-wire, said securing means remaining integral with the stay wire but cabled together with the strand wire. And, finally, my object is to provide a complete organization of mechanical instrumentalities combined into a single machine for the rapid production of wire fabric, in which the fabric is formed continuously, that is dispensing with the usual step-by-step movements, and allowing the finished product to advance at a continuous single rate of speed, thereby eventuating in a more rapid production of the finished product and with less strain upon the machine.

Other particular objects and advantages of my invention will be brought out in the course of the following description, and that which is new and novel will be correlated in the appended claims.

My invention consists in a plurality of tested instrumentalities which have heretofore had a more or less independent existence, combining these instrumentalities into a unified construction adapted to operate automatically and in progressive succession in order to accomplish a definite desideratum,—the production of a mechanically perfect wire fabric, and that at a minimum of expense.

The preferred manner for carrying out the object of my invention in a practical manner, and that which in practice I have found to give a maximum of efficiency, is shown in the accompanying drawings, in which—

Figure 1 is a front-side elevation of my complete machine. Fig. 2 is a plan view of the machine, partly in section as taken on the line 2—2 of Fig. 1. Fig. 2$^a$ shows a central cross-section of the reel winding-mechanism, which is shown in plan in Fig. 2. Fig. 3 is an end view, showing the right-hand end of the machine in elevation. Fig. 4 is a detail perspective view, showing certain of the parts in position, particularly of the wire-cutter, the left-hand marginal twister, and one of the intermediate twisters. Fig. 5 is a vertical section taken through the machine, as on the line 5—5 of Fig. 1. Fig. 6 is a detail perspective view of the cam mechanism for operating the wire cutter, and also showing the left hand marginal twister. Fig. 7 is a detail view as taken on line 7—7 of Fig. 6. Fig. 8 is a detail sectional view as taken on line 8—8 of Fig. 5, showing the means for adjusting the cutter mechanism. Fig. 9 is an enlarged detail view, in perspective, showing the bed-plate and certain of the twisters, and showing certain of the means for accomplishing some of the important functions. Fig. 10 is a cross section taken through the bed-plate, and as taken on line 10—10 of Fig. 1, showing one of the intermediate twisters, and the means for its operation and control. Fig. 11 is a rear elevation of the parts shown in Fig.

10, the bed-plate not being shown in this instance. Fig. 12 is an elevation of the opposite side of the parts shown in Fig. 10, the bed-plate being shown in section, and the view as taken on line 12—12 of Fig. 1. Fig. 13 is a front elevation of the parts shown in Figs. 10, 11 and 12, the bed-plate not being shown. Fig. 14 is a top plan view of the parts shown in Figs. 10, 11 12 and 13, the upper face of a portion of the bed-plate being shown. Fig. 15 is a detail plan view, showing a portion of the shaft which operates in and longitudinally of the bed-plate, showing the means for operating said shaft, and showing certain of the spiral gear wheels which are secured to said shaft for operating certain of the twisters. Fig. 16 is a detail perspective view of the right-hand marginal twister in operative position. Fig. 17 is a vertical central section taken through the parts shown in Fig. 16. Fig. 18 is a top plan view of one of the intermediate twister heads. Fig. 19 is a vertical central section of one of the intermediate twister heads, as taken on line 19—19 of Fig. 18. Fig. 20 is a detail perspective view of one of the travelers, or stay-wire feeders. Fig. 21 is a top plan view of the parts shown in Fig. 20. Fig. 22 is a detail plan view of one of the grips carried by the travelers for preventing back-slack of the stay-wire feed. Fig. 23 is a detail side view of one of the trailers or cams for actuating the twisters. Fig. 24 is a front end view of the trailer shown in Fig. 23. Fig. 25 is a side view of one of the trailers, showing the same reversely and inverted from that shown in Fig. 23, and showing the sprocket-chain in connection therewith, and Fig. 26 is a view of the underside of the trailer shown in Figs. 23, 24 and 25.

Similar indices refer to like parts throughout the several views of the eight sheets of drawings.

I will now take up a detail description of the several parts of my present invention, in which I will describe the several features of the construction and operation as briefly and as comprehensively as I may.

The various mechanisms of my machine are mounted on and carried by a suitable frame-work, the construction of which I am not particularly concerned with at this time, but a suitable construction is herein shown and which comprises the two end members A and B, right and left respectively, which are rigidly connected together at the floor line by the sill C. In the central portion of the front the said members A and B are connected by the bed-plate D, the latter being disposed at an angle sloping downward from left to right, for the purpose hereinafter referred to, and the cross section of said bed-plate is shown most clearly in Figs. 10 and 12.

Letter W denotes the tension device, shown in Fig. 1, and in cross-section in Fig. 5, the same being secured to the sill C as shown. Said tension device comprises a set of three rollers for each of the line wires hereinafter referred to. Extending across on top, extending between and beyond, the end members A and B, is the main bulldozer-shaft E. Mounted on top of the respective members A and B are the upwardly extending auxiliary end members F and G, between which and the members A and B the shaft E is revolubly mounted in suitable boxings H and I. The extensions F and G are Y-shaped, providing each with two upwardly diverging portions as shown in Figs. 3 and 5. An adjustable boxing is mounted in each of said diverging portions of said members F and G, by which are carried the two shafts J and K.

The bulldozer is made up of a plurality of wheel-like castings $e$ which are mounted on the shaft E, and in the peripheries of said castings $e$ are secured a plurality of pipes or rods $e'$ which extend in an axial direction with relation to the shaft E, thereby forming the major member of the bulldozer; the two minor members of the bulldozer are constructed in substantially the same manner as the major member, except that they are of less diameter in cross section, these being formed also of wheel-like castings, with pipes or rods secured on their peripheries, for instance as shown in Fig. 1. The pipes of the minor members of the bulldozer are adapted to mesh with the pipes $e'$ of the major member of the bulldozer, for the purpose of crimping and for gripping the finished product and for advancing it through the machine.

Mounted around on the shaft E, near the boxing H, is the gear wheel E', and likewise mounted on the respective shafts J and K are the smaller gear wheels J' and K', which mesh with the gear wheel E', as in Fig. 5.

Mounted on the outer right-hand projection of the shaft E is the large gear wheel L, the same having an inwardly projecting hub on which is mounted the two sprocket rings M and N, which latter are frictionally connected to the wheel L substantially as follows: The sprocket rings M and N may be formed integral with each other or they may be bolted together, at least they should have an inwardly projecting web $n$ common to both. Disposed around between the web $n$ and the web of the wheel L is a wood ring $r$ which is secured to the web of the wheel L, as by the screws $g$. Disposed around in contact with the inner face of the web $n$ is the wood ring $p$. And contacting with the ring $p$ and extending to and rotatably fitting around the boxing I, of the shaft E, is the metal disk X. The wood ring $p$ is secured to the disk X as by the screws $m$. A plurality of comparatively large screws Z connect the disk X with the web of the wheel L, but these screws Z do not come into contact with the wood rings r and p, or with the flange n, all as shown in Fig. 2. It will now be apparent that by tightening the screws Z that the disk X will be drawn toward the wheel L thereby clamping the web n between the wood rings r and p, and holding the same vice-like. Therefore, should the pull become too great on the sprockets M and N then the web n may slip, the tension being controlled by the screws Z as desired.

Rigidly mounted to the outer face of the member B, below and to the rear of the shaft E, and extending outward, is the spindle O, on which is revolubly mounted the gear-wheel P. Said gear wheel P has integrally connected thereto, concentric therewith, and projecting inward therefrom, a hub-pinion Q, which meshes with the gear wheel L, as indicated in dotted lines in Fig. 3.

Extending through from members A to B is the main shaft 1, which is located in the rear of the bed-plate D, on the outer right-hand end of which shaft is secured the pinion 2, Fig. 3, which meshes with the wheel P as shown. Also secured on the shaft 1 but immediately to the left of the member B is the gear wheel 3, Fig. 2. Secured on the shaft 1, to the right of the member A, is the bevel gear 4, the purpose of which I will hereinafter set forth. Extending out from the outer face of the member B is a bracket 5 which carries a shaft 6, on the outer projecting portion of which is the drive belt pulley 7, and the corresponding idle pulley 7′.

Mounted on the shaft 6 is the pinion 8 which meshes with the gear wheel 3, as in Fig. 2. Mounted on the inner end of the shaft 6 is a larger gear wheel 9, which meshes with the gear wheel U, as shown in Fig. 15, the latter being secured on the shaft 10, and by which said shaft is driven at a constant rotation in one direction. Said shaft 10 extends parallel with and is located within the bed-plate D and extends from end to end thereof, its function being to drive the twisters.

Numeral 11 denotes a miter gear-wheel which is of larger diameter than, but is driven by, the miter wheel 4 (Figs. 2 and 5) the latter being secured on the shaft 1. Said gear wheel 11 is secured on the rear end of the shaft 12, which latter extends forward and is carried in suitable boxings attached to the inner face of the member A as shown in Fig. 5. Secured on the forward end of the shaft 12 is the miter wheel 13. Meshing with the wheel 13 is a similar miter wheel 14, the latter being secured on the angularly disposed shaft 15. Said shaft 15 is disposed at right angles to the bed-plate D, and it is mounted in suitable boxings carried on the front edge of the member A, as shown in Fig. 1. A comparatively large sprocket wheel 16 is secured on the upper end of the shaft 15, said sprocket being in direct alinement with a channel formed in the face of the bed plate D, as indicated in Fig. 5.

Mounted in suitable hangers to the forward edge of the member B is the shaft 17, the same being located parallel to the companion shaft 15, and mounted on the upper end of the shaft 17 is the sprocket wheel 18 which corresponds with the sprocket wheel 16, and like the sprocket wheel 16 it is located in alinement with the channel formed in the face of the bed-plate D, as shown in Fig. 3.

Connecting the two sprocket wheels 16 and 18 is the sprocket chain 19 which, of course, operates parallel with the bed-plate D. When the machine is in operation then the inner half of the sprocket chain 19 is at all times traveling from right to left and near to the face of the bed-plate D, and resting on the ledge d thereof, as in Fig. 9. The return or outer portion of the sprocket chain 19, which travels from left to right, is supported on the horizontal portion of angle-bar Y, the latter being carried by the arms y which extend out from the bed-plate D.

Mounted on the hub of the wheel 11, as in Fig. 8, is the cam 20, it being adjustably secured thereto by the set screws 20′. Numeral 21 designates a boxing secured to the inner face of the member A and parallel to the shaft 12. Mounted in said boxing 21 is a shaft 22, on the rear end of which is secured the pitman 23. Revolubly mounted on the rear face of the pitman 23 is the roller 24, located toward the outer portion thereof, against which the periphery of the cam 20 engages. The free or outer end of the pitman 23 is retained resiliently in position, normally down, by the helical spring 25, whose lower end is secured to the member A as indicated. Secured to the forward end of the shaft 22 and projecting to the right (to the left as seen in Fig. 6) is the arm 26 which is provided with a channel in the outer portion of its forward face as indicated in Figs. 6 and 7, in which channel may operate the roller 27. Said roller is mounted on a stem which is secured in the rear face of the vertically operable standard 28, the latter being mounted in a channel formed in the rear face of the block 29, where it is retained slidably in position by the bars a and a′. The block 29 is secured to the bed-plate D and extends to the rear therefrom. The upper end portion of the right-hand side of the block 29 is notched in parallel with the right-hand side of the standard 28, and secured in this notch is the stationary blade 30, shown in Figs. 4 and 6. Carried by the upper end of the standard 28 is the knife 31 which is brought into shearing contact with the blade 30 as the standard 28 is lowered.

The letter S denotes a plurality of intermediate line-wires, which are intended, eventually, to form the horizontal strand wires of a fence.

The marginal line wires are denoted by the indices S' and S'', the former intended to, eventually, form the top wire and the latter the bottom wire of the fence.

The stay wires are denoted by the letter T.

Secured to the bed-plate D, immediately to the right of the cutter block 29, is the left-hand marginal twister block 32 on which is revolubly mounted the left-hand marginal twister head 33, the same having a stem which extends down through said block 32, with a right-hand spiral gear wheel 34 secured on the lower projecting end thereof. The gear wheel 34 meshes at right-angles with a companion spiral gear wheel 35, the latter being mounted on the shaft 10. A wire aperture is formed vertically and centrally through the head 33, the stem thereof, and the gear wheel 34, through which may be fed, upward, the marginal wire S'', all substantially as indicated in Fig. 6. Also, as shown in Fig. 6, a hook e'' is formed on the upper face of the head 33, which hook is adapted to grasp the wire I and twist it around the wire S'', that is when the wire T is brought down on the face of the head 33 where it can be grasped by said hook, and this last operation takes place immediately following the severing of said wire by said cutter.

The twister for the right-hand marginal wire is shown in detail in Figs. 16 and 17, in which numeral 36 designates the right-hand marginal twister-block. Numeral 37 denotes the right-hand marginal twister-head which has a stem extending down through the block 36, and with a left-hand spiral gear wheel R secured on the lower end of said stem. Said gear wheel R meshes with a corresponding left-hand spiral gear wheel V which is secured on the shaft 10, substantially as shown in Fig. 15. Located on the upper face of the head 37 is formed the twister hook f and it extends out horizontally from the central portion thereof. An aperture is formed centrally through the head 37, the stem thereof, and the spiral gear R, through which may operate upward the marginal wire S'. The wires T which intermittently are drawn across the face of the head 37 are normally prevented from inadvertently coming into contact with the hook f by means of the two guards 38 and 39 which are secured on either side of the block 36 and project upward slightly higher than the hook f, as in Figs. 16 and 17, said wires being adapted to be drawn across on the upper edges of said guards as shown.

The numeral 40 denotes a curved finger which projects forward and which is adapted, at the proper time, to press down the wire T where it may be engaged by the hook f, as in Fig. 16, the means for operating said finger being hereinafter described.

Located intermediate of the marginal twisters above referred to are a plurality of intermediate twister mechanisms which are identical with each other in every essential particular, each being supported on its individual block, viz: 41, 42, 43, 44, 45, 46, 47, 48, 49, 50, 51, 52, 53, 54, 55, 56, 57 and 58, all of said blocks being secured to and carried by the bed-plate D, therefore, I will describe only one of these intermediate twister mechanisms, which description will answer for a description of all, and for which purpose I have selected, arbitrarily, the twister mechanism connected to block 46, and which is shown in detail in Figs. 10, 11, 12, 13, 14, 18 and 19, and which I will now describe: Formed vertically through the block 46 is an aperture to slidably receive therein the barrel-stem 59 (Fig. 19) which has a wire aperture formed longitudinally therethrough. Secured on the lower end of the stem 59 is the right-hand spiral gear wheel 60 (Fig. 10) which meshes at right angles with a corresponding right-hand spiral gear wheel 61, the latter being secured on the shaft 10. Formed integral with the upper end of the stem 59 is the head 62, and extending around, and projecting above, said head is the collar 63, said collar being secured to said head 62 by a plurality of screws $h$. Located on top of the block 46 is a round disk 64 which has a flange extending out around its periphery, and having a central aperture therethrough for the stem 59. Said disk 64 is retained rotatably in position by the collar 65 which is secured to the top of the block 46 and which collar is provided with an angle channel in its inner periphery for the tongue or flange of said disk to operate in, as in Fig. 19. Secured in said disk 64, to one side of the center thereof, and extending upward a considerable distance thereabove, is the twister pin 66, which extends upward through an aperture therefor in the head 62, as in Fig. 19. By the above it is apparent that the head 62 may be moved up and down, but that the pin 66 will remain relatively stationary as to vertical movements, but it will be carried revolubly around with the head 62. At one side the inner periphery of the collar 63 extends inward a considerable distance over the head 62 forming the lip $i$, as in Fig. 18.

Formed in the center-portion of the face of the head 62, around the aperture for the wire S, is a socket in which is fitted the eyelet 67 which has an upwardly projecting portion of smaller diameter than its body. Said eyelet 67 is formed of very hard material, in order to minimize the wear thereof by the wire S which passes up centrally therethrough, as indicated in Fig. 19. A plate 68 covers the face of the head 62, it being retained in place by an inwardly extending flange formed on the inner periphery of the collar 63, as in Fig. 19. The smaller portion of the eyelet 67 extends through flush with said plate, said eyelet being retained in place by said plate as shown in Fig. 19. An aperture is formed through the plate 68 through which may operate the pin 66. Mounted revolubly in an aperture in said plate 68 is a roller 69 which rests on the face of the head 62 and rises upward to near the top of the collar 63. Said roller 69 is mounted on the spindle 70, the latter extending down through the head 62 in which it is secured.

Secured to the lower forward angle of the bed-plate D (Fig. 12) is the boxing 71 in which is rotatably mounted the axle 72 for the angular-arm 73, said arm having a rocking movement at right-angles to the shaft 10. Pivoted to and located at the rear end of the arm 73, and extending upward therefrom, is the connecting-bar 74 which has a vertical slot formed through its upper flattened portion, as shown in Fig. 12. Extending upward from the arm 73, forward of the bar 74, is the finger 75, on the upper end of which is revolubly mounted the roller 76. The roller 76 is adapted to contact with the under face of the spiral gear 60 in order to raise the gear 60 as in Fig. 12, or allowing it to drop down, by gravity, to the position shown in Fig. 10. Located at an angle and mounted on the forward end of the arm 73 is the roller 77 whose function will be hereinafter referred to in its proper sequence.

Secured to the rear part of the block 46 and extending rearward, and slightly downward, is the hanger-brace 78. Pivoted to the side of the outer end portion of the hanger 78 is the arm 79 which extends upward and forward as indicated. The upper end of the bar 74 is adjustably connected to the arm 79 by the screw 74$^a$ which is secured in the arm 79 and operates in said slot of the bar 74. Said connection is located forward of the connection of the hanger 78 with the arm 79, all as indicated in Fig. 12. The connection of the bar 74 with the arm 79 is such that the bar 74 may have a greater movement than the arm 79.

Mounted to the upper end of the arm 79, and extending forward over the upper end of the twister-head above described, is the hand 80 which has two forwardly extending fingers which stride the wire S, and which are adapted to press down on the wire T, as will hereinafter be explained. Said hand and its fingers are normally retained up, to the position shown in Fig. 12, by the helical spring 81. Said spring is coiled about the stem 82 and extends expansively between the base of the hanger 78 and the flange of the arm 79. Said stem 82 is secured at one end in the base of the hanger 78 and projects back through a slot formed through the arm 79. A resiliency is imparted to the downward movements of the hand 80 by the coil spring 83, which is disposed around the stem 82, between the head of said stem and the rear face of the flange of the arm 79, all substantially as shown in Fig. 12.

Mounted rigidly on the upper end of the hanger 78 is a forwardly extending guide or brace 84 which is adapted to cause the hand 80 to come down at the right place, and also preventing its being moved to the right out of proper position.

The operation of the finger 40, hereinbefore referred to, is substantially the same as that of the hand 80, and the mechanism for operating said finger is the same as that shown in Figs. 10 and 12, the only difference being that in the right-hand mechanism the finger 40 is substituted in place of a hand and fingers 80, the finger 40 being secured to the upper end of the arm 79, and projects forward rather more than do the fingers of the hand 80.

In order to prevent the wires T from being pushed back farther than they should be across the twisters, I provide certain of the twister blocks with a stop 114, the same being secured to the sides of said blocks and extending upward and located substantially as shown in Figs. 11, 12, 13 and 14.

Carried by the sprocket chain 19 are the two travelers, or carriers for the stay wires T. These two travelers being identical with each other in construction and operation, it will be seen that a description of only one will answer for both; and the details thereof are shown in Figs. 20, 21 and 22, to which reference is now made: The base, or body, 85 of the traveler is connected into and made a part of the sprocket chain 19, as indicated. The inner lower portion of said base 85 extends inward and travels in said channel therefor formed in the forward face of the bed-plate D, the ledge $d$ forming the lower part of said channel. Formed integral with the base 85 is the carriage 86 whose upper face is tilted at an angle sloping downward from left to right, when the base is in connection with the bed-plate D,— that is when it is in operative position, as in Fig. 9.

Extending out forward from the carriage 86 is the horn-like receiver 87 which has an aperture therein through which passes the wire T. Revolubly mounted on the rear portion of the carriage 86 is the comparatively large pulley wheel 88, having a groove formed around in its periphery, over which passes the wire T. Secured on top of the carriage 86 is the guard 89 which curves partly around near the periphery of the pulley 88 whose function is to retain the wire T in the groove of the pulley 88 as shown in Fig. 21. Also mounted on the carriage 86 is the clamping device shown in Fig. 22, the same comprising the offset plate 90 having teeth formed on its inner shoulder. Mounted between the offset portion of the plate 90 and the face of the carriage 86 is the eccentric lever 91, the same being mounted on a permanent pivot 92. The periphery of the eccentric portion of the lever 91 is also provided with teeth which are adapted to approach near to and are oppositely disposed to said teeth of the plate 90. The wire T is adapted to pass freely between said two sets of teeth when moving in the direction indicated by the arrow, but when the wire T attempts to move in the opposite direction it is grasped by said teeth and prevented from moving in that reverse direction.

The numeral 93 denotes a coilspring secured at one end to the free end of the lever 91, the other end being attached to the axle 94 of the pulley wheel 88, as in Fig. 21. Said spring is adapted to retain the teeth of the lever 91 at all times in contact with the wire T as in Fig. 22.

As the sprocket chain 19 is carried around it will of course carry the travelers or feeders just described across from right to left in the positions shown in Fig. 9. The two travelers are located an equal distance apart with relation to the chain 19, whereby as one of the travelers finishes its work at the left side of the machine the other traveler will be ready to commence its work at the right side of the machine, as indicated in Figs. 1 and 2. Following closely after each of said travelers is a trailer-cam, and these two trailer-cams are identical with each other, therefore I will describe but one which description will answer for both, the same being shown in detail in Figs. 23 to 26, inclusive, and which may be described as follows: The trailer-cams are denoted by numeral 95, and they are of very peculiar formation, and each comprises a body or base which forms a link in the chain 19, as indicated, and one portion of which is adapted to slide in said channel formed in the face of the bed plate D, being the same channel as used by the travelers above referred to, in fact the body portions of the trailers are identical with the body portions of the travelers, as will be apparent by a comparison of Figs. 20 and 34. As will be observed, the heads of said trailers are disposed at an angle with relation to the body portion, as will be noticed in Fig. 24. As the trailer 95 advances along the side of the bed-plate the roller 77 will be in position to be guided in and will enter the channel formed therefor along in the under side of the head thereof, as in Fig. 9, and said channel being curved outward at its forward end it will manifestly cause the roller 77 to be moved rearward, and then forward, as the trailer advances. The moving rearward of the roller 77 will cause the arm 73 to turn on its axle 72, eventuating in releasing the gear 60 and pulling downward on the bar 74, thereby causing the hand 80 to push tightly downward on the wire T and bringing it into contact with the top of the twister therebelow. As the trailer continues to advance the roller 77 will be forced forward, as in Fig. 12, causing the hand 80 to be raised, and also pressing the gear 60, and the twister thereto attached, upward to the position shown in Fig. 12.

Connecting the lower portions of the members A and B, at the floor line, is the rear-sill C' as shown in Fig. 2. Some distance above the sill C' the members A and B project farther to the rear, and on said projections are carried the boxings 96 and 97, respectively. In the boxing 96 is mounted the stub-shaft 98 which carries on its inner end the head 99. A short shaft 100 is mounted in the boxing 97, the shaft 100 being in alinement with shaft 98. Secured on the inner end of shaft 100 is the head 101, similar to head 99.

Adapted to connect the heads 99 and 101, and removably mounted therein, are the two reel members 102 and 102' which are spaced apart, and when the two are in position they form a reel which is substantially round in cross section. The finished product is adapted to be wound on said reel as it issues from the bulldozer. The operation of said reel is substantially this: The shaft 100 projects out some distance to the right of the member B. Secured on the shaft 100, near the member B, is the ratchet wheel 103. The hub of the ratchet wheel 103 projects outward around the shaft 100 to near the outer end of said shaft, as shown in Fig. 2ª. Revolubly mounted on the hub of the wheel 103, and adjoining the outer face of said ratchet-wheel, is the large sprocket wheel 104, which has a small outwardly projecting hub fitting around the hub of the ratchet wheel substantially as shown. Mounted on the inner face of the sprocket wheel 104 is the pawl 105 whose point is resiliently retained in contact with the periphery of the ratchet wheel 103. Also mounted revolubly on the hub of the wheel 103, and adjoining the hub of the sprocket-wheel 104, is the small sprocket-wheel 106. Formed integral with the sprocket-wheel 106 is the ratchet-wheel 107. Surrounding the outer end of the shaft 100, but not connected thereto, is the arm-disk 108 which is secured to the end of the hub of the wheel 103 by tap-bolts 109. Mounted on the inner face of the disk 108 is a pawl 112 whose point is adapted to contact with the teeth of the ratchet wheel 107. Said pawl 112 may be released from contact with said ratchet and be retained out of action by means of the stop 113. It should be noticed that the pawl 105 is adapted to push right-handed, while the pawl 112 is adapted to push left-handed. The sprocket wheel 104 is connected to the sprocket-disk M by the sprocket chain 110; and the sprocket-wheel 106 is connected to the sprocket disk N by the sprocket-chain 111.

The object of the reel mechanism just described is to provide means for varying the rate of rotation of the reel as the amount of finished product wound thereon increases in dimension, the operation thereof being substantially as follows: The sprocket disks M and N are of the same diameter and therefore rotate at the same rate of speed, and they have a constant rotation in one direction when the machine is in operation. Therefore, when the amount of finished product on the reel is small it is essential that the reel make a greater number of revolutions, and this is accomplished by allowing the pawl 112 to engage the ratchet 107, whereby the disk 108 will be carried around to the right, carrying with it the ratchet-wheel 103 and its hub which are secured to the shaft 100, eventuating in rotating the shaft therewith, to the right, at the speed to which it is geared by reason of the size of the smaller sprocket-wheel 106. The above operation will, of course, allow the pawl 105 to remain idle as it will not be able to maintain the speed of the ratchet with which it is adapted to engage. Now, should it be desired to decrease the rate of rotation of the reel, then I have only to turn the pawl 112 out of action and secure it out of operative position by means of the stop 113, which will allow the sprocket-wheel 106 and the ratchet wheel 107 to operate idly, thereby placing the pull upon the sprocket-wheel 104 and causing the pawl 105 to engage the ratchet 103, which will eventuate in rotating the shaft 100 at a slower rate of speed than before, depending upon the size of the larger sprocket wheel 104.

The operation of this invention will, perhaps, have been understood from the foregoing description, when taken in connection with the drawings, but it may be well to recapitulate, briefly, some of the more essential movements: First, the line-wires are brought up and around their respective rollers of the tension device W, each wire being threaded through one of the twisters as in Fig. 12. The line-wires are then brought up through the bulldozer, between the major and the minor members thereof, and they are then extended back and down to the reel to which they are all secured, each of the line-wires being drawn from a source independent of the others. The wires T are to be drawn from two sources of supply, providing two lengths of wire T, one of which is threaded to each of the travelers in the manner shown in Figs. 20 and 21. The ends of said wires when not in use are left projecting out from the pulley 88, as shown at the lower central part of Fig. 2. Now, if the machine be started by revolving the pulley 7, the several mechanisms will be operated synchronously, or in proper succession, in relation to each other, the several gears, wheels, levers, and pulleys being accurately timed whereby there will be no interference of parts or devices, but each will accomplish its particular function with certainty and precision. Suppose, now, for instance, that the machine is in operation: The line wires will be pulled through the machine by the bulldozer and the reel at a constant rate of speed. The operation of the machine will cause the travelers 85 to be carried alternately across the face of the bed-plate. As one of the travelers passes the right-hand marginal twister the free end portion of the wire T will strike the wire S' and immediately thereafter the trailer cam 95 will force the roller 77 outward, causing the finger 40 to press the end of the wire downward where it will be engaged by the hook $f$ which will twist it around the wire S, as shown in the upper right-hand corner of Fig. 9. As the traveler advances it will of course bring the wire T across the wire S at the right, and at right-angles thereto. Immediately after the traveler passes one of the wires S the trailer-cam following thereafter will force the roller 77 first outward, which will cause the fingers of the hand 80 to press the wire T downward, where it will be engaged by the twister-pin 66, which will form a loop in the wire T as the twister advances. Said loop will be carried around to the opposite side of the twister, the loop being now within the collar 63, where it will impinge the roller 69 which will wind the loop tightly around the wire S, and at the completion of which the twister head will be lifted up thereby causing the pin 66 to be withdrawn from the loop, after which the twister head will drop back ready to form a new loop. These loops are cabled together and with the wire S form a compact, neat, and very rigid tie, and they are very quickly formed as the travelers and the trailers advance across the machine.

The slope given to the bed-plate is such that the time required by the traveler in passing from wire S' to wire S'' will approximately equal the distance the line wires travel upward in order to cause the loops of each stay-wire to be in horizontal alinement in the finished product, that is, as shown at the top of Fig. 9. As the loop is completed around the last intermediate wire S at the left, then the wire T will of course be disposed across the wire S″ and have been brought under the knife 31. Immediately after the traveler has passed the knife 31 said knife will be brought down (by means of the mechanism shown in Fig. 6) into shearing contact with the blade 30, severing the wire T, as in Fig. 4, and at same time drawing the wire T down where it will be grasped by the hook e″, which latter will twist said wire around the wire S″. After the wire T is severed, as just stated, a projecting end will remain as shown, and this projecting end will then be carried around and back to the other side of the machine, by the sprocket chain 19, as in Fig. 2. Soon after the said traveler and trailer complete their work at the left side of the machine the other traveler and trailer will commence their work at the right-hand side of the machine, they repeating the operation just described with relation to the first traveler and trailer. The interval between the commencement of the two travelers and trailers at the right-hand side of the machine is such that the line wires may travel upward the proper distance to make the desired space between each two of the stay wires in the finished product.

The machine herein described will produce a fence fabric in which the line wires will be rigidly cabled into connection with stay or cross wires at each intersection thereof, and it is to be understood that the number of line-wires can be varied, and the length of the stay-wires can also be varied to suit the height of the fence to be produced.

Having now fully shown and described my invention, that which I regard as new, and desire to secure by Letters Patent of the United States, is—

1. In a machine for making wire fabric, comprising in combination, a frame, an angularly disposed bed-plate carried by the frame, a plurality of twister-blocks mounted on the bed-plate, a twister mechanism carried by each of said blocks, means whereby said twisters may be revolved horizontally, means for moving said twisters vertically during the time they are being revolved, and means whereby one of said twisters will be rotated oppositely to that of the other twisters, all substantially as set forth.

2. In a machine for making wire fabric, a plurality of intermediate twisters each comprising in combination, a head, a stem extending down from the head, a spiral-gear carried by the lower end of the stem, a stationary block in which said stem may operate both revolubly and endwise, a disk revolubly mounted on the surface of said block concentric with said stem, a twister-pin secured in said disk and projecting upward through an aperture therefor in said head, a collar secured around said head and projecting thereabove, a plate mounted on the face of said head with an aperture therethrough for said twister-pin, a roller carried by said plate, the same being pivoted to said head, and means for raising and lowering said head independent of the rotation thereof, all substantially as set forth.

3. In a machine for making wire fabric, a frame having two end members spaced apart, a bed-plate extending across the frame at an angle horizontally, a bulldozer mounted between the upper portions of the end members, a reel revolubly mounted between the rear portions of the end members, a shaft mounted in the bed-plate and extending longitudinally thereof, and means for operating the bulldozer, the reel, and said shaft continuously by power, all substantially as set forth.

4. A machine for making wire fabric, comprising a frame, an angularly disposed bed-plate carried between the end members of the frame, a shaft revolubly mounted parallel with the bed-plate, a plurality of spiral gears carried by said shaft, one of said gears being provided with a left-hand thread while the others are provided with right-hand threads, twister-blocks mounted on the bed-plate and corresponding in number to the number of said spiral-gears, a twister carried by each of said twister-blocks, a spiral-gear connected to each of said twisters and meshing with and at right-angles to the corresponding first-named spiral gears, and means for rotating said shaft continuously to operate said twisters by power, all substantially as shown and described.

5. In a machine for making wire fabric, the combination with a suitable frame, of a bed-plate connecting the end members of the frame, said bed-plate being disposed at an angle sloping downward from one end of the machine to the other, and a shaft rotatably mounted in the bed-plate and extending longitudinally thereof.

6. In a machine for making wire fabric, the combination with a frame, of a bed-plate connecting the end members of the frame, said bed-plate being disposed at an angle with relation to the floor-line, a shaft revolubly mounted in the bed-plate, and a plurality of twister mechanisms carried by the bed-plate and operable by said shaft and at right-angles thereto, all substantially as shown and described.

7. In a machine for making wire fabric, the combination of a frame, a bed-plate connecting the end members of the frame, said bed-plate being located at an angle horizontally, a shaft revolubly mounted in the bed-plate and longitudinally thereof, a plurality of twister mechanisms carried by the bed-plate, and spiral gears connecting the twister mechanisms with said shaft and at right-angles thereto.

8. In a machine for making wire fabric, the combination with a frame having end members, of an angularly disposed bed-plate connecting the end members of the frame, said bed-plate having a channel formed in its forward face, a shaft mounted in said channel of the bed-plate and extending parallel therewith, a plurality of tie forming mechanisms mounted on the bed-plate, and means for operating certain parts of said tie forming mechanism by power taken from said shaft, all substantially as shown and described.

9. In a machine for making wire fabric, the combination of a frame, a bed-plate connecting the end members of the frame and disposed at an angle with relation thereto and having a channel formed in its forward face from end to end thereof, a plurality of tie forming devices carried by the bed-plate, a sprocket chain carried continuously in one direction immediately in front of said channel, and means carried by said chain for actuating certain parts of said tie forming mechanisms.

10. In a machine for making wire fabric, the combination of a frame, a bed-plate disposed at an angle horizontally and extending from end-to-end of the machine and having a channel formed in the forward face thereof, a shaft mounted in said bed-plate and extending from end-to-end thereof, a plurality of tie-forming mechanisms carried by the bed-plate, a sprocket-chain carried continuously in one direction immediately in front of said channel in the bed-plate, means carried by said chain for actuating certain parts of said tie-forming mechanisms, and means for actuating certain other parts of said tie-forming mechanisms by power taken from said shaft, substantially as set forth.

11. In a machine for making wire fabric, the combination of a frame, a bed-plate connecting the end members of the frame, said bed-plate being located at an angle horizontally, a shaft revolubly mounted in the bed-plate and extending longitudinally thereof, means for revolving said shaft continuously in one direction, a plurality of twister mechanisms carried by the bed-plate, spiral gears connecting said shaft to said twisters, a sprocket chain operable parallel with said bed-plate, and wire feeding mechanisms carried by said sprocket chain.

12. In a machine for making wire fabric, the combination of a frame, a bed-plate connecting the end members of the frame, said bed-plate being disposed horizontally at an angle, a shaft mounted near to and parallel with said bed-plate, means for revolving said shaft continuously in one direction, a plurality of blocks mounted on the bed-plate, a plurality of intermediate tie forming mechanisms each carried by one of said blocks, a marginal twister mechanism located near each end of the bed-plate, and a wire severing mechanism located outward from one of said marginal twister mechanisms.

13. In a machine for making wire fabric, comprising a frame, a bed-plate extending from end-to-end of the frame, one end of said bed-plate being located at a higher elevation than the other, a shaft operable in one direction and located parallel with said bed-plate, tie forming devices carried by the bed-plate and located in alinement with each other and parallel with the bed-plate, stay-wire delivery devices carried in one direction and adjacent to the bed-plate, and means for actuating said tie-forming devices in proper sequence.

14. In a machine for making wire fabric, the combination of a bed-plate disposed at an angle, a plurality of intermediate tie-forming devices located on the bed-plate, marginal twisters located on the bed-plate, a wire-cutting device located on the bed-plate, a plurality of travelers geared to travel in one direction immediately in front of the bed-plate, a trailer-cam adapted to follow each of said travelers, and means for actuating all of said mechanisms in proper sequence and by a single source of power, all substantially as set forth.

15. In a machine for making wire fabric, the combination of a frame, a bed-plate carried by the frame and disposed at an angle with relation thereto, a plurality of intermediate tie-forming devices located on the bed-plate, marginal twisters located on the bed-plate, a wire cutting device located on the bed-plate, each of said intermediate tie-forming devices and marginal twisters having means whereby a line-wire may travel upward therethrough, a plurality of stay-wire delivery devices adapted to be carried in one direction from end-to-end of the bed-plate and to deposit the stay-wires across the line-wires to be secured to the line-wires by said marginal twisters and said intermediate tie-forming devices and to be cut off at the proper length by said wire cutting device, and means for operating all of said devices in proper sequence.

16. A machine for making wire fabric, comprising in combination, a frame, a bed-plate carried by the frame and disposed at an angle sloping downward, a plurality of the forming devices carried by the bed-plate, a pair of marginal twisters carried by the bed-plate, a wire cutting device carried by the bed-plate, each of said tie-forming devices and marginal twisters being adapted to allow a line wire to travel upward therethrough, a plurality of stay-wire delivering devices geared to travel in one direction immediately in front of the bed-plate and deliver the stay wires to said marginal twisters, the tie-forming devices, and the wire cutter in proper succession, and a bulldozer for advancing the line-wires at a continuous rate of speed.

17. A machine for making wire fabric comprising a frame, a bed-plate carried by the frame and disposed at an angle sloping downward, a plurality of tie-forming devices carried by the bed-plate, a pair of marginal twisters carried by the bed-plate, a wire cutting device carried by the bed-plate, each of said tie-forming devices and marginal twisters being formed to allow a line wire to travel therethrough, a plurality of stay-wire devices geared to travel at a continuous rate of speed immediately in front of the bed-plate and to deliver the stay-wires to said marginal twisters, the tie forming devices, and the wire cutter, in proper succession, a bulldozer for advancing the line-wires at a continuous rate of speed, and a reel for automatically winding the finished product into rolls.

18. A machine for making wire fabric composed of line-wires and stay-wires crossing the line wires, comprising a frame, a bed-plate extending longitudinally of the frame and disposed at an angle horizontally, a pair of marginal twisters for securing the ends of the stay-wires to the marginal line-wires, a cutter for severing the line-wires at the proper length, a plurality of tie forming devices for forming loops in the stay wires and for twisting said loops around the intermediate line-wires, and means for operating all of said devices in proper succession, all substantially as described.

19. A machine for making wire fabric composed of line-wires and stay-wires crossing the line wires, said machine comprising a frame, a bed-plate disposed at an acute angle and extending longitudinally of the frame, a tie-forming device for each line-wire for forming loops in the stay-wires and for cabling said loops around in connection with their respective line-wires, means for twisting the ends of the stay-wires around the marginal line-wires, means for cutting the stay-wires at the proper length, means for advancing the line-wires at a constant rate of speed, and means for carrying the stay-wires to position, all substantially as shown and described.

20. In a machine for making wire-fabric composed of line-wires and stay-wires disposed thereacross, a frame-work, a bed-plate carried by the frame and disposed at an angle with relation thereto and having a channel formed longitudinally in the face thereof, blocks mounted on the bed-plate, a tie forming mechanism for each intermediate line-wire for forming loops in the stay-wires and for coiling said loops around the line-wires, twisting devices for connecting the ends of the stay-wires to the marginal line-wires, a cutter for forming the stay-wires of the proper length, travelers for delivering the stay-wire material to the line-wires, traveler-cams for actuating said tie-forming devices and twisting devices as the stay-wire material is delivered to position.

21. The combination in a wire fabric making machine, of a bed-plate disposed horizontally at an obtuse angle with relation to the floor-line, having a channel formed in its forward face and having an opening extending longitudinally thereof and opening rearwardly, and a shaft mounted in said opening and extending longitudinally thereof.

In testimony whereof I have hereunto subscribed my name to this specification in the presence of two subscribing witnesses, this the 30th day of April, 1909.

WILLIAM N. PARRISH.

Witnesses:
WILLIAM H. ALFORD,
ROBERT W. RANDLE.